[US006202992B1](#)

United States Patent
O'Reilly et al.

(12) United States Patent
(10) Patent No.: US 6,202,992 B1
(45) Date of Patent: Mar. 20, 2001

(54) ANTI-JACKING LEVELING VALVE

(75) Inventors: Paul O'Reilly, Cerritos; Tarig Latif, Downey, both of CA (US)

(73) Assignee: Barksdale, Inc., Los Angeles, CA (US)

( * ) Notice: Subject to any disclaimer, the term of this patent is extended or adjusted under 35 U.S.C. 154(b) by 0 days.

(21) Appl. No.: 09/261,399

(22) Filed: Mar. 3, 1999

(51) Int. Cl.[7] .................................................. F16F 9/342
(52) U.S. Cl. ........................................................ 267/64.18
(58) Field of Search .............................. 267/64.16, 64.18, 267/64.22, 31; 137/625.21, 625.46; 251/208; 280/5.515, 124.163, 124.159, 124.16

(56) References Cited

U.S. PATENT DOCUMENTS

| | | |
|---|---|---|
| 4,033,608 * | 7/1977 | Sweet .................................. 280/711 |
| 4,570,972 | 2/1986 | Pangos . |
| 4,673,172 | 6/1987 | Blanz . |
| 4,726,571 | 2/1988 | Smith et al. . |
| 4,964,433 * | 10/1990 | Marietta ................................. 137/115 |
| 5,560,591 | 10/1996 | Trudeau et al. . |
| 5,584,497 | 12/1996 | Lander et al. . |
| 5,682,922 | 11/1997 | Galazin et al. . |
| 5,934,320 * | 8/1999 | O'Reilly ........................... 137/625.21 |
| 5,979,504 * | 11/1999 | Spivey ................................. 137/636.1 |

* cited by examiner

Primary Examiner—Christopher P. Schwartz
Assistant Examiner—C. T. Bartz
(74) Attorney, Agent, or Firm—Leon D. Rosen

(57) ABSTRACT

A leveling valve (30) is provided, of the type that lets air flow from a pressured source (40) into an airbag (24) and that lets air flow from the airbag to the atmosphere, to maintain a predetermined airbag height, which avoids jacking wherein the height of the airbag repeatedly increases as the vehicle moves over a rough road. A pair of inserts in the leveling valve are selected so the passage of the insert that passes pressured air to the airbag is made significantly smaller in diameter than the passage of the insert that passes air from the airbag to the atmosphere.

10 Claims, 3 Drawing Sheets

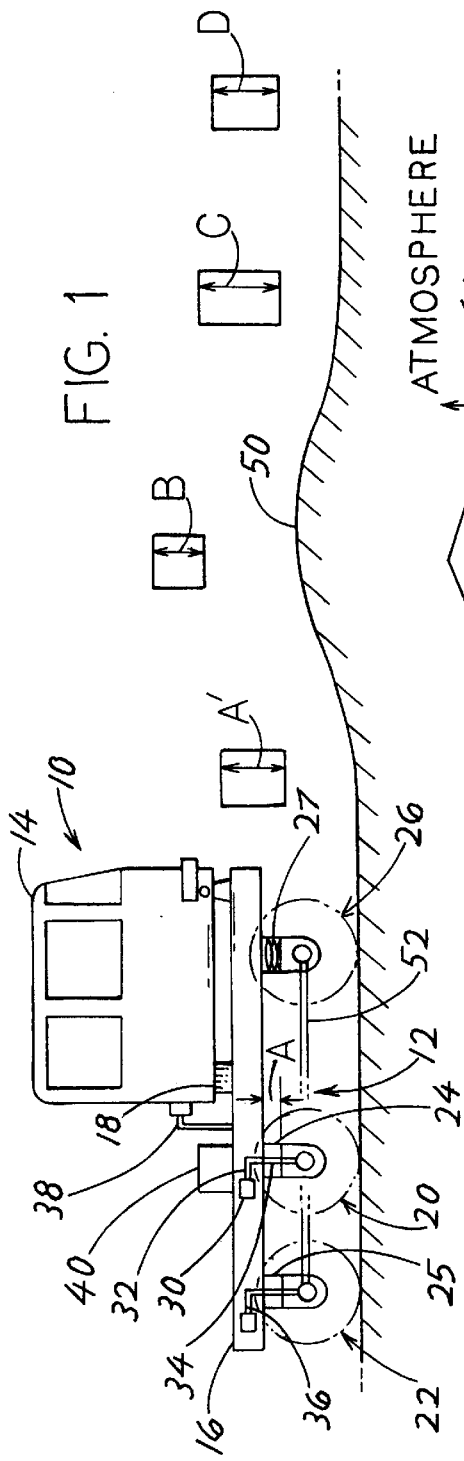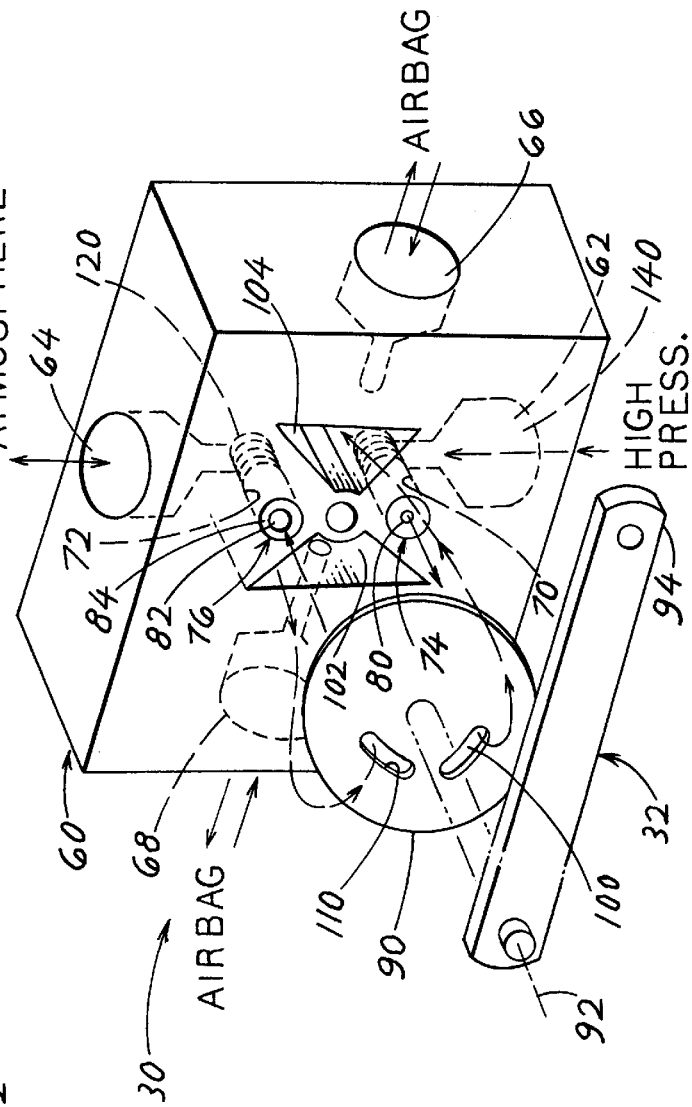

ANTI-JACKING LEVELING VALVE

BACKGROUND OF THE INVENTION

Airbags are common used in large vehicles as springs. For example, airbags are used to support a vehicle cab on a chassis to absorb shocks from road bumps and potholes. Airbags are also used to support the bed of a trailer on the frame of the trailer to absorb road shocks. A vehicle manufacturer commonly sets a predetermined height for the airbag. A leveling valve is coupled between cab and frame and maintains the predetermined airbag height by flowing air from a pressured air source into the airbag when the height decreases below a predetermined range (e.g. 4 inches to 5 inches), and to flow air from the airbag into the atmosphere when the height increases beyond the predetermined range. The pressured air source is commonly set to maintain a pressure between 125 and 135 psi, with this pressured air source also being used to operate a horn, pneumatic seat and other miscellaneous equipment on the vehicle. The optimum pressure range for an airbag may be about 40 to 70 psi for a nearly fully loaded (about 75% of maximum design) vehicle (the cab may be always nearly fully loaded).

It is found that when a vehicle with the above leveling system moves over a rough road, that the leveling system "jacks". That is, the airbag height repeatedly increases to a height greater than the design range (4 inch to 5 inches). When the vehicle is at rest for an extended period (e.g. one minute at a stoplight), the optimum height is reached, but then the airbag and chassis jack up again. Then the airbag height increases above the selected range of height, and the airbag pressure has increased significantly, resulting in a considerably harsher ride. Such a harsher ride for the cab of a tractor places greater stress on the driver. A similar condition exists for the primary suspension system of the tractor, where the bag height may be about 15 inches. A system that avoided such jacking, without significantly increasing the cost of the vehicle leveling system, would be of value.

SUMMARY OF THE INVENTION

In accordance with one embodiment of the present invention, a vehicle leveling system is provided that avoids jacking of the airbags using a simple and low-cost modification of a prior leveling system. The leveling valve, which includes a pressured air insert through which pressured air flows to the airbag, and an exhaust insert through which air flows from the airbag to the atmosphere, is modified by making the passage of one insert significantly smaller than the passage of the other insert. The passage of one of the pressured air inserts is of a smaller cross-sectional area than that of the other insert. The smaller area results in an air flow rate from the pressured source to the airbag, which is closer to the flow rate from the airbag to the atmosphere, even though the pressure drop (e.g. 125 psi to 40 psi) through one insert is greater than the pressure drop (e.g. 40 psi to 0 psi) through the other insert. Applicant prefers to more closely equalize the flow rate by restricting the high pressure insert, so less air is used by the leveling system when the vehicle moves over a rough road.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side elevation view of a vehicle with a leveling system, and indicating how the height of the airbag varies as the vehicle moves over a bump in the road.

FIG. 2 is a simplified exploded isometric view of the leveling valve of the system of FIG. 1.

DESCRIPTION OF THE PREFERRED EMBODIMENTS

Figure 3:
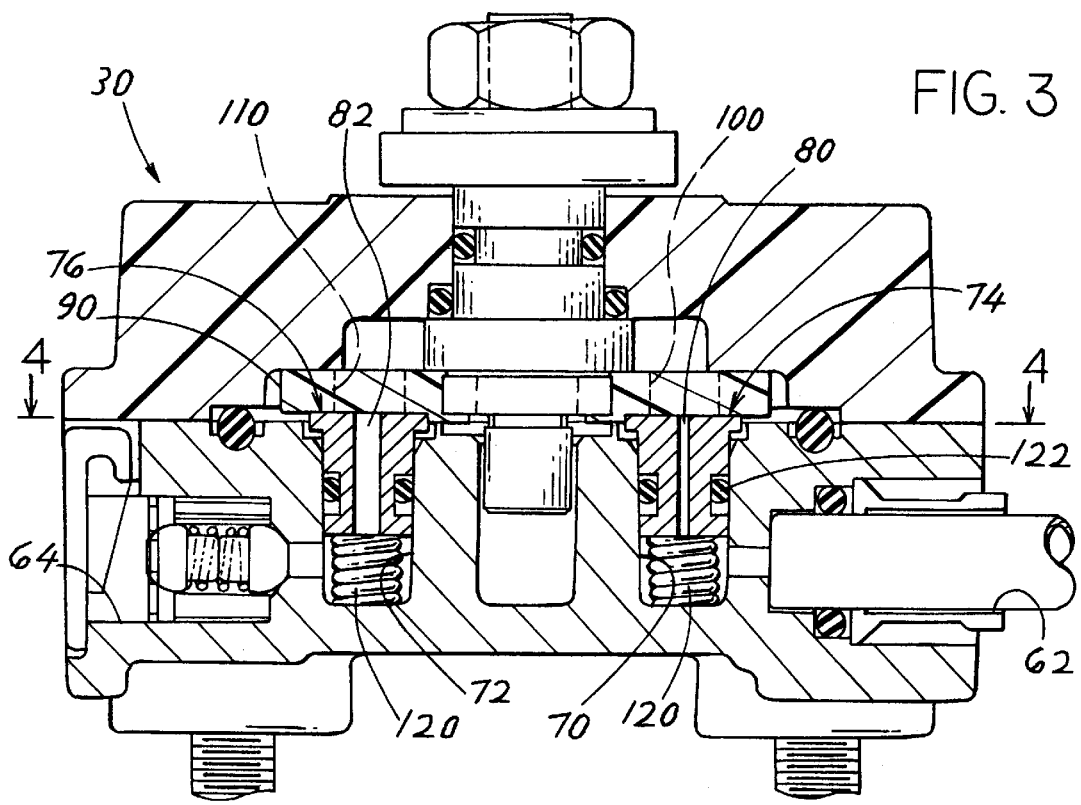
FIG. 3 is a detailed sectional view of a leveling valve of the type shown in FIG. 2, and is taken on line 3—3 of FIG. 4.
Figure 4:
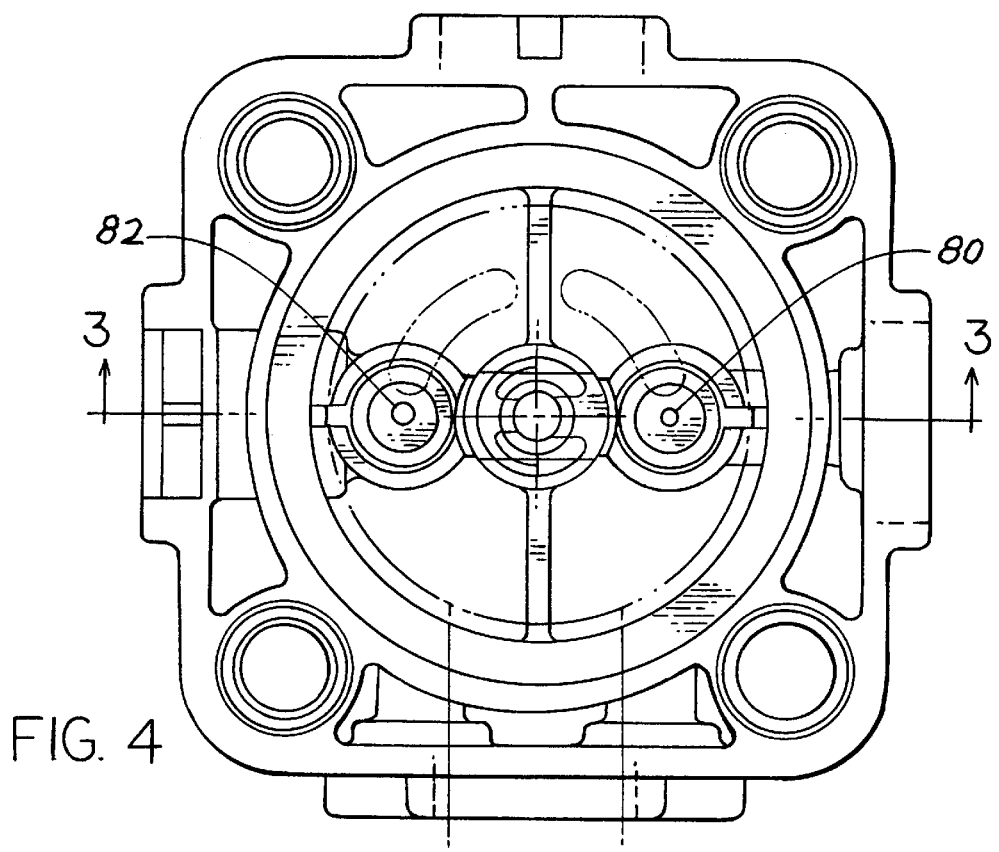
FIG. 4 is a view taken on line 4—4 of FIG. 3, and showing the orifice member and lever in phantom lines.

FIG. 1 illustrates a vehicle 10 with a leveling system 12. The particular vehicle is a tractor that is used in a tractor-trailer arrangement. The vehicle includes a cab 14 supported on a chassis 16 by a first air bag 18. The chassis is supported on axle and wheel assemblies 20, 22 by airbag devices or airbags 24, 25. A front axle and wheel assembly 26 is supported on the chassis through a leaf spring assembly 27. The leveling system 12 is designed to maintain a predetermined largely constant height A for the airbags 24, 25. The leveling system includes a leveling valve 30 mounted on the chassis and coupled through a lever 32 and a link 34 to the axle assembly 20. Other similar linkage 36, 38 are used for the other airbags. In the following discussion, the operation of the airbag 24 is discussed in detail, although the other airbags operate in a similar manner.

When the height of the airbag 24 decreases below the set height A, the lever 32 pivots in a first direction and the leveling valve 30 opens to pass pressured air from a pressured air source 40 to the airbag device 24, to increase the pressure of air and thereby increase the height of the airbag to the set height A. On the other hand, if the height of the airbag increases above the set level A, then the leveling valve allows air in the airbag to be exhausted into the atmosphere to reduce the height of the airbag until it is at the set level A. The chassis of a trailer pulled by the tractor is also supported by several airbags that maintain a predetermined height even when the weight of the load changes greatly. A common height A for a chassis-axle airbag may be 15 inches, while a common height for a cab-chassis airbag is 5 inches Airbags commonly have a preferred maximum pressure such as 40 psi at which they significantly isolate the cab from shocks resulting from road irregularities. Such pressure is commonly set by the vehicle manufacturer. The pressured air source 40 commonly has a preset pressure of 125 psi to 135 psi. This pressure is adequate to operate a horn, pneumatic seats in the cab, and other equipment other than the brakes.

Vehicles often undergo a phenomenon referred to as "jacking" wherein the cab height above the chassis or frame assembly and above the road constantly increases as the vehicle moves along a moderately rough road, with the vehicle height decreasing back to the optimum level only when the vehicle is stationery, as at a stoplight. FIG. 1 shows the vehicle approaching a bump 50 in the road. It is assumed that the airbag is at the set level A' such as 15 inches, prior to reaching the bump. As the vehicle moves up the bump, the frame 16 does not rise as far as the wheel assemblies, and the airbag is shown compressed to a smaller height B such as 13 inches. As the vehicle moves down the bump, the frame does not drop as fast as the wheel assemblies, and the airbag height increases to perhaps 15.5 inches for a moment before returning toward the original height A'. However, the actual height D at the end of the bump is a height such as 15.1 inches. As the vehicle goes over the next bump, the height D may increase to 15.2 inches. This increase in height continues until the airbag height is perhaps several inches above the set level A' of 15 inches, with the pressure of air in the airbag being several psi higher than the predetermined level such as 40 psi.

The increased pressure in the airbag results in a "stiffer" ride for the driver, which is bad for his health. Also, when the chassis rides higher, the angle of the drive shaft 52 changes and the drive shaft pinion and universal joint along the drive train wear faster than expected.

The reason for the jacking, which is the phenomenon where the height of the airbag repeatedly increases above the set level A, is due to the differences in pressure drops when the airbag is being refilled, as compared to when it is being emptied. When the airbag moves up along the beginning of the bump, air is exhausted from the airbag at 40psi to the atmosphere at 0 psi, for a 40 psi pressure drop. However, when the vehicle moves down along the end of the bump, air moves from the pressured source at perhaps 130 psi to the airbag at 40 psi, or a pressure difference of 90 psi. The leveling valve is open about the same amount of time when the vehicle moves up the bump as when it moves down the bump. However, because of the larger pressure difference of perhaps 90 psi during airbag refill, more air is pumped into the bag during the last part of the bump, then is released from the bag during the first part of the bump. The result is that the airbag pressure repeatedly increases as the vehicle moves over numerous bumps in the road. When the vehicle comes to a prolonged rest, as when it is stopped at a long stoplight, the leveling system slowly returns the airbag height to its preset level A. However, when the vehicle begins moving down the road again and the wheel assemblies repeatedly bounce up and down, the airbag height increases again to significantly above the preset level.

FIG. 2 is a simplified view of the leveling valve 30, which controls the flow of air into and out of the air bag. The valve includes a molded body 60 with four ports. A first port 62 is connected to the high pressure source (e.g. 130 psi). A second port 64 is open to the atmosphere (0 psi). Third and fourth ports 66, 68 (which could be a single port) are connected to the airbags such as 24 that lie on opposite sides of the vehicle.

The leveling valve body has a pair of bores 70, 72 that receive inserts 74, 76 (usually stainless steel or ceramic). Each insert has a passage 80, 82 through which air flows. Each insert also has a face 84 that presses against a surface of a plate-like orifice member 90. The orifice member 90 is pivotally mounted about an axis 92 on the body, and is fixed to the lever 32 that senses changes in airbag height. When the airbag height decreases below the set height, an outer end 94 of the lever moves up, which brings a pressure opening 100 of the orifice member into alignment with the passage 80 in the high pressure insert 74. This allows pressured air to flow through the pressured air insert 74 and through the orifice 100, and through common conduit portions 102, 104 and out through the airbag ports 66, 68 to fill the airbag. When the airbag height reaches a set range (e.g. 14 to 15 inches), the lever outer end 94 has moved down and the orifice 100 has moved out of line with the passage of the pressured air insert 74.

When the airbag height increases above the set height, the lever outer end 94 moves down, causing an exhaust opening 110 in the orifice member to move into line with the passage 82 of the exhaust insert 76. This allows pressured air from the airbags to flow into the leveling valve through the airbag ports 66, 68 to the common conduit portions 102, 104, and through the exhaust opening 110 and the exhaust insert passage 82, so the air can flow out through the exhaust port 64 into the atmosphere. This lowers the height of the airbag, causing the orifice member to pivot until the exhaust opening 110 is no longer in line with the passage of the exhaust insert 76.

It is noted that the leveling valve 30 includes a pair of springs 120 that press the inserts 74, 76 against the flat face of the orifice member 90 to avoid the leakage of air when neither of the orifice openings is in line with an insert passage. The insert members 74, 76 undergo perhaps the greatest wear, and are of simple shapes suitable for machining, and they are commonly formed of steel or ceramic, while the body 60 and orifice member 90 are commonly formed of molded plastic or molded die cast metal (e.g. a zinc alloy). The inserts are installed by merely pushing them into their corresponding bores, with the orifice member 90 installed over them and with the springs pushing the insert against the orifice member.

In accordance with the present invention, applicant greatly reduces vehicle jacking with minimal change in the existing leveling valve, by changing one of the inserts 74 through which pressured air moves from the pressured air port 62 to the airbag ports 66, 68. Applicant manufactures pressured air inserts 74 with passages 80 of diameters that are significantly smaller than the diameters of the passages 82 in the exhaust inserts 76. That is, the cross-sectional areas of the high pressure passages 80 are at least 10 percent less than the cross-sectional areas of the exhaust passages 82. The smaller cross-sectional areas of the passage 80 of the air pressure insert results in a reduction in the air flow rate when pressured air is being flowed into the airbag. Thus, even though the pressure drop of 90 psi (130 psi–40 psi) of air going into the airbag is much greater than the pressure drop of perhaps 40 psi for air moving out of the airbag to the atmosphere, the flow rate of air is about the same. This more closely equalizes the amount of air moving into and out of the airbags when the vehicle moves over a bump (or into and out of a pothole).

Instead of constricting the passage 80 in the pressured air insert 74, it would be possible to increase the cross-sectional area of the passage 82 in the exhaust insert 76. However, this would result in a greater volume of air outflow for each bump, resulting in more energy being used to produce pressured air in the air pressure source, and less pressured air being available to operate other accessories energized by the air pressure source. It also would be possible to vary the size of the openings 100, 110 in the orifice member 90. However, openings of reasonable size are required to assure they will be aligned with the insert passages, and a small opening in the molded orifice member could result in rapid wear. Since applicant's inserts 74, 76 are simple parts which are inserted into the bore in the molded body, switching to inserts with different size passages results in minimal additional cost.

Figure 5:
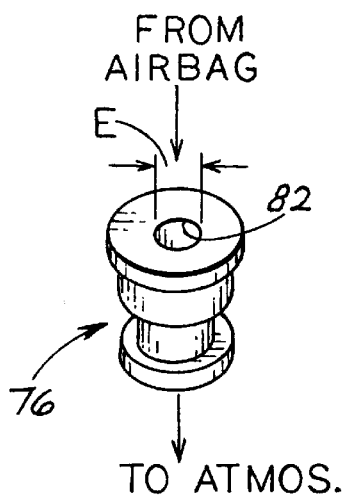
FIG. 5 is an isometric view of the exhaust insert of the valve of FIG. 3.
Figure 6:
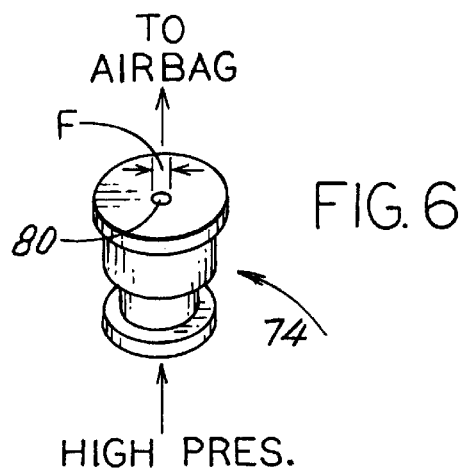
FIG. 6 is an isometric view of the pressured air insert of FIG. 3.

FIG. 3 is a sectional view of an actual leveling valve 30 manufactured by applicant, showing that the passages 80, 82 of the pressured air insert 74 and exhaust insert 76 are of different diameters. The outside of each insert is sealed to its corresponding bore 70, 72 by O-rings 122. FIGS. 5 and 6 show details of the exhaust insert 76 and of the pressured air insert 74. Previously, applicant constructed each insert so its passage 82 had a diameter E of 0.105 inch. Applicant maintains this diameter for the exhaust insert 76. However, for the pressured air insert 74, applicant constructs the diameter F so it is 0.052 inch. This results in a cross-sectional area for the passage 80 which is about one-fourth (one-third to one-fifth) that of the passage of the exhaust insert. A much smaller cross-sectional area for the inlet insert passage is generally required, because the rest of the conduits through which air is flowing are kept the same as in the previous leveling valve. As shown in FIG. 2, pressured air flows through a first conduit 140 through the high pressure air port 62 to the airbag port 66, 68, along common conduit portions 102, 104 through which exhaust air is flowed (in the reverse direction) from the airbags to the exhaust conduits 64. Since restrictions along all but the passages 80, 82 remain the same as in a prior leveling valve, a greater reduction in a cross-sectional area of the high pressure passage 80 is required (e.g. to ¼ its previous value) for a given reduction in air flow (e.g. to ½ the previous flow rate).

In most cases, the cross-sectional area of the pressured air insert passage is made no more than half the cross-sectional area of the exhaust insert passage. Applicant manufactures pressured air inserts 74 with a plurality of different passage diameters F (all at least 10% less than diameter E), for systems with different preferred air bag pressures at nearly full load (about 75% of maximum) and different pressured air source pressures.

Figure 7:
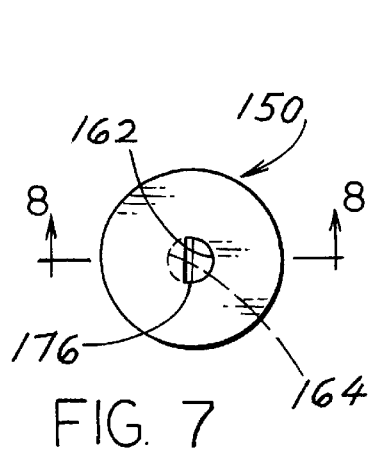
FIG. 7 is a front elevation view of an adjustable insert, constructed in accordance with another embodiment of the invention, which can be used in the valve of FIG. 3.
Figure 8:
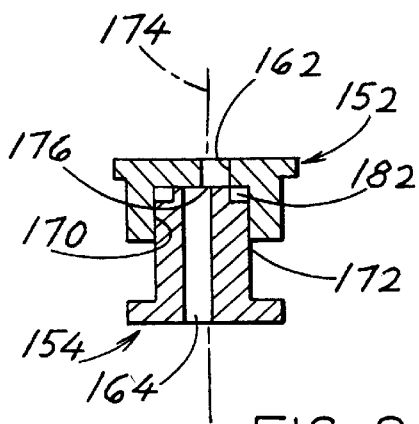
FIG. 8 is a sectional view taken on line 8—8 of FIG. 7.
Figure 9:
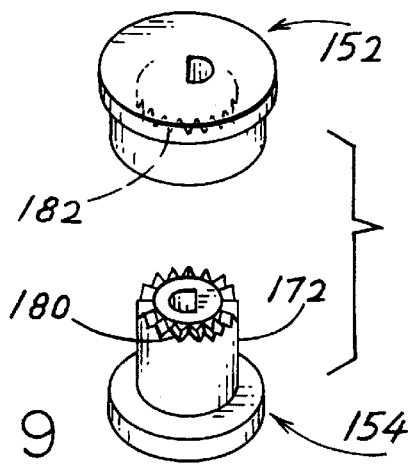
FIG. 9 is an exploded isometric view of the adjustable insert of FIG. 8.

FIGS. 7–9 illustrate an insert 150 of simple construction whose equivalent passage diameter can be varied. The variable insert 150 includes first and second parts 152, 154 that have corresponding passage parts 162, 164. The first part 152 has a cylindrical recess 170 that receives a cylinder 172 of the second part. The insert has an axis 174. The recess 170 and cylinder 172 are centered on the axis 174. However, the passage parts 162, 164 are off center from the axis 174. As a result, when the second part 154 is turned to different positions, the area of interface 176 between the passage parts varies. As shown in FIG. 9, the cylinder 172 of the second part 154, has a circle of teeth 180 that engage a circle of teeth 182 in the second part, to retain the relative rotational positions of the two parts. Each spring which pushes an insert against the orifice plate, keeps the teeth 180, 182 engaged to prevent relative rotation of the parts 152, 154. Although the variable insert 150 can be used, it is probably desirable to merely provide high pressure inserts with different diameter passages, to be selected according to the desired pressure in the airbag and the pressure of air in the air source on the vehicle.

Thus, the invention provides a vehicle leveling system which is similar to a prior system, but with small and low-cost changes that avoid jacking of the vehicle. The changes are that the conduit portion through which pressured air flows from a high pressure air source to the airbag is constricted to reduce the rate of flow of air to more nearly equal the rate of flow of air out of the airbag into the atmosphere. As a result, when the vehicle repeatedly moves over road bumps and potholes, during which air flows into and out of the airbag, the flow rate of air into and out of the airbag is about the same. The constriction is produced by installing a pressured air insert in the bore of the leveling valve body, which has an insert passage of smaller diameter (effective diameter) than the diameter of the exhaust insert that lies in the same body. The inserts are simple parts that are already separately inserted into bores of the injection molded body, and their modification and installation are easily performed. An insert can be used whose effective passage diameter is variable, with a variable insert including at least two parts that are moveable relative to each other to vary the effective passage diameter.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. In a vehicle leveling system for a vehicle that includes a wheel assembly having a wheel that rolls on a road, where the leveling system includes an airbag device that supports a second part adapted to be fastened on said vehicle to a first part adapted to be fastened on said vehicle, a pressured air source, and a leveling valve coupled to said vehicle parts to fill said airbag from said source through a filling conduit when the airbag height decreases below a set range and to exhaust air from the airbag through an exhaust conduit to the atmosphere when the airbag height increases above said set range, where the difference in air pressure between said source and said airbag may be greater than the difference in air pressure between said airbag and the atmosphere, and where said filling and exhaust conduits have separate filling and exhaust conduit portions that are used only when filling and exhausting air to and from said airbag, respectively, the improvement wherein:

said filling conduit portion includes a part forming a constriction that causes air to flow at a slower rate through said filling conduit for a given pressure drop than through said exhaust conduit for said given pressure drop, to decrease the actual flow rate through said filling conduit to make it closer to the flow rate through said exhaust conduit.

2. In a vehicle leveling system for a vehicle that includes a wheel assembly having a wheel that rolls on a road, where the leveling system includes an airbag device that supports a second vehicle part on a first vehicle part, a pressured air source, and a leveling valve coupled to said vehicle parts to fill said airbag from said source through a filling conduit when the airbag height decreases below a set range and to exhaust air from the airbag through an exhaust conduit to the atmosphere when the airbag height increases above said set range, where the pressure of air in said airbag is lower than the pressure of air supplied by said source, and where said filling and exhaust conduits have separate filling and exhaust conduit portions that are used only when filling and exhausting air to and from said airbag, respectively, the improvement wherein:

said filling conduit portion includes a part forming a constriction that causes air to flow at a slower rate through said filling conduit for a given pressure drop between ends of said filling conduit, than through said exhaust conduit when said given pressure drop exists between ends of said exhaust conduit, to decrease the actual flow rate through said filling conduit to make it closer to the flow rate through said exhaust conduit;

said leveling valve has a body and a lever pivotally mounted about an axis on said body, with said body and said lever coupled one to a first of said vehicle parts and the other to the other of said vehicle parts, so a change in height of said airbag causes pivoting of said lever, and with said lever having an orifice member with at least one opening spaced from said axis and coupled to said airbag;

said leveling valve including a pair of inserts having faces and having through passages with outer passage ends opening to said faces, and with inner passage ends, with said faces lying against and covered by said orifice member, with said at least one opening in said orifice member moving into alignment with different ones of said faces as said lever pivots in opposite directions, and with a first of said inserts forming a portion of said filling conduit and with a second of said inserts forming a portion of said exhaust conduit;

the passage of said first insert has a smaller diameter than the passage of said second insert.

3. The system described in claim 2 including:

a plurality of inserts that are substantially identical to said first insert except that their passages are of different diameters, to thereby enable selection of an insert of appropriate diameter for a system with a predetermined high pressure and predetermined desired air bag pressure at said largely full load.

4. The system described in claim 2 wherein:

said first insert has at least two parts that are adjustable in relative position to vary the effective passage diameter of said first insert.

5. A vehicle leveling valve for passing air from a high pressure air source to an airbag and for exhausting air from the airbag to the atmosphere, comprising:

a body having a pressure inlet, an exhaust outlet, and an airbag port, said body having a pair of insert-holding bores including a pressure bore coupled to said pressure inlet and an exhaust bore coupled to said exhaust outlet;

a pair of inserts, each lying in one of said bores;

a lever pivotably mounted on said body and an orifice member fixed to said lever to pivot with it, said orifice member having orifice portions coupled to said airbag port;

said inserts each having a through passage with outer and inner ends, with each insert having a face with its passage outer end opening to said face, and each face bearing against said orifice member, with said orifice member positioned to block the flow of air through each passage outer end until said lever pivots from a quiescent position to bring one of said orifice portions in line with an insert passage outer end;

said inserts having passages of different diameters, to offer different resistances to air flow through their passages.

6. The valve described in claim 5 wherein:

the insert that lies in said pressure bore has a passage whose cross-sectional area is no more than half the cross-sectional are of the insert that lies in said exhaust bore.

7. The valve described in claim 5 wherein:

the insert that lies in said pressure bore has a passage whose cross-sectional area is about one-fourth the cross-sectional area of the insert that lies in said exhaust bore.

8. The valve described in claim 5 wherein:

at least one of said inserts has two parts that are relatively moveable to vary the effective passage diameter of the insert.

9. A method for minimizing jacking of a vehicle leveling system of a vehicle, where said leveling system includes an airbag that supports a first part adapted to be fastened on said vehicle to a second part adapted to be fastened on said vehicle, and a leveling valve that allows air to flow from a pressured air source to the airbag, and from the airbag to the atmosphere, when the airbag height respectively decreases and increases from a set height, wherein the leveling valve has a body with a pair of bores and with pressured air, exhaust, and airbag ports, and with the leveling valve having a pair of inserts lying in said bores wherein said inserts have insert passages with inner and outer passage ends, with said pressured air port connected to an inner passage end of a pressured air insert in one of said bores, and with said exhaust port connected to an inner passage end of an exhaust insert in the other one of said bores, with an orifice member blocking and opening communication between said airbag port and the outer ends of selective ones of said inserts, as the height of said airbag varies, comprising:

placing an insert in each of said bores, with one insert having a passage of smaller diameter than the passage of the other insert, to change the jacking characteristics of the leveling system.

10. The method described in claim 9 wherein said leveling system is designed to maintain a predetermined air pressure in said airbag when a predetermined largely full load is carried by said chassis, with said pressured air source constructed to maintain a pressure that is greater than said predetermined air pressure, and wherein:

said step of placing includes placing a pressured air insert and an exhaust insert in corresponding ones of said bores, where the passage of said pressured air insert has a cross-sectional area that is no more than half the cross-sectional area of the passage of said exhaust insert.

* * * * *